United States Patent
Shiriike et al.

(10) Patent No.: US 8,475,310 B2
(45) Date of Patent: Jul. 2, 2013

(54) FRICTION TRANSMISSION BELT

(75) Inventors: Hiroyuki Shiriike, Kobe (JP);
Tomoyuki Yamada, Kobe (JP);
Hiroyuki Tachibana, Kobe (JP);
Fumihiro Mukai, Kobe (JP)

(73) Assignee: Bando Chemical Industries, Ltd., Kobe-Shi, Hyogo (JP)

( * ) Notice: Subject to any disclaimer, the term of this patent is extended or adjusted under 35 U.S.C. 154(b) by 178 days.

(21) Appl. No.: 12/864,221

(22) PCT Filed: Jan. 23, 2009

(86) PCT No.: PCT/JP2009/000261
§ 371 (c)(1),
(2), (4) Date: Jul. 22, 2010

(87) PCT Pub. No.: WO2009/093465
PCT Pub. Date: Jul. 30, 2009

(65) Prior Publication Data
US 2010/0298079 A1    Nov. 25, 2010

(30) Foreign Application Priority Data
Jan. 25, 2008    (JP) .................. 2008-015651

(51) Int. Cl.
*F16G 5/04*    (2006.01)
*F16G 1/06*    (2006.01)

(52) U.S. Cl.
USPC ......................................... 474/238

(58) Field of Classification Search
USPC ........................................... 474/238
See application file for complete search history.

(56) References Cited

U.S. PATENT DOCUMENTS

| 3,992,958 | A | * | 11/1976 | Bonnefon | 474/238 |
| 4,956,036 | A | * | 9/1990 | Sedlacek | 156/137 |
| 4,976,662 | A | * | 12/1990 | Miranti, Jr. | 474/205 |
| 6,056,656 | A | * | 5/2000 | Kitano et al. | 474/268 |
| 6,770,004 | B1 | * | 8/2004 | Lofgren et al. | 474/266 |
| 7,137,918 | B2 | * | 11/2006 | Nonnast et al. | 474/260 |
| 7,896,767 | B2 | * | 3/2011 | Nakashima | 474/261 |
| 2002/0187869 | A1 | * | 12/2002 | Martin et al. | 474/260 |

(Continued)

FOREIGN PATENT DOCUMENTS

| JP | 2003254390 A | * | 9/2003 |
| JP | 2004-232743 A | | 8/2004 |

(Continued)

OTHER PUBLICATIONS

International Search Report for PCT/JP2009/000261 mailed Apr. 28, 2009.

*Primary Examiner* — William E Dondero
*Assistant Examiner* — Mark K Buse
(74) *Attorney, Agent, or Firm* — Roberts Mlotkowski Safran & Cole P.C.

(57) ABSTRACT

In a friction transmission belt in which a compression rubber layer provided to an inner circumferential side of the belt body is wrapped over pulleys such that the compression rubber layer contacts the pulleys, such a configuration that both of a noise reduction and durability while the belt is running can be achieved is obtained. The compression rubber layer is configured so as not to include short fibers and so as to have a surface roughness, i.e., an Ra of at least a pulley contact surface of the compression rubber layer equal to or more than 3 μm.

7 Claims, 3 Drawing Sheets

U.S. PATENT DOCUMENTS

| | | |
|---|---|---|
| 2004/0018906 A1 * | 1/2004 | Sedlacek .................. 474/260 |
| 2004/0214676 A1 | 10/2004 | Shiriike et al. |
| 2009/0048048 A1 | 2/2009 | Nakamura et al. |
| 2009/0298632 A1 | 12/2009 | Shiriike et al. |

FOREIGN PATENT DOCUMENTS

| | | | |
|---|---|---|---|
| JP | 2004-324880 A | 11/2004 |
| JP | 3110794 U | 6/2005 |
| JP | 2006-144988 A | 6/2006 |
| JP | 2006-266280 A | 10/2006 |
| JP | 2007-70592 A | 3/2007 |
| JP | 2007-170454 A | 7/2007 |
| JP | 2007-170587 A | 7/2007 |

* cited by examiner

FRICTION TRANSMISSION BELT

TECHNICAL FIELD

The present invention relates to a friction transmission belt in which a compression rubber layer provided to an inner circumferential side of a belt body is wrapped over pulleys such that the compression rubber layer contacts the pulleys in order to transmit a power. The present invention belongs to technical fields of a noise reduction and a longer product life.

BACKGROUND ART

Conventionally, as a configuration for transmitting a driving force, for example, of an engine or a motor to a driven side, a configuration that the pulleys are coupled to shafts of a driving side and the driven side and a friction transmission belt is wrapped over these pulleys has been widely known. In the above described friction transmission belt, a high power transmitting ability is required as well as quietness during running the belt is required. In order to satisfy these requirements, it is required to reduce a friction coefficient of a belt surface as long as a predetermined power transmitting ability can be kept. For example, in a case where the friction transmission belt is a V-ribbed belt, as it is disclosed in Patent Document 1, short fibers which are oriented in a belt width direction are mixed into a compression rubber layer, which contacts the pulleys, for the sake of reinforcing the compression rubber layer, and the short fibers are provided so as to be projected out from the belt surface to reduce the friction coefficient of the belt surface, thereby improving a noise reduction and an abrasion resistance.

The above Patent Document 1 discloses a configuration in which a rubber component is mixed with powders made of a thermosetting resin for the purpose that the friction coefficient can be reduced even in a case where the short fibers of the compression rubber layer drop out or are worn out.

[Patent Document] Japanese Patent Application Laid-open Publication No. 2006-266280

SUMMARY OF THE INVENTION

Problem to be Solved by the Invention

As described above, in the friction transmission belt including the compression rubber layer mixed with the short fibers, a friction coefficient can be reduced by the short fibers. However, when the compression rubber layer is repeatedly bent while the belt is running, cracks tend to occur in the rubber layer around the thin elongated short fibers. In other words, in the friction transmission belt mixed with the short fibers, the noise can be reduced while the belt is running. However, there is a problem that bending fatigue resistance is degraded in such friction transmission belt in comparison with a belt without the short fibers mixed therein.

The present invention was made in view of the above described point. A purpose of the invention is directed to obtain a configuration in which both of the noise reduction and the durability can be achieved, while the belt is running, in the friction transmission belt which is wrapped over the pulleys such that the compression rubber layer provided to the inner circumferential side of the belt body contacts the pulleys.

Solution to the Problem

In order to achieve the above described purpose, the friction transmission belt of the present invention is configured such that the compression rubber layer which contacts the pulleys does not include the short fibers but has a surface roughness, i.e., an Ra of equal to or more than 3 μm at a pulley contact surface of the compression rubber layer, thereby achieving an improvement of the durability as well as the noise reduction according to the reduction of the friction coefficient.

More specifically, a first invention is directed to a friction transmission belt in which the compression rubber layer provided to the inner circumferential side of the belt body is wrapped over the pulleys such that the compression rubber layer contacts the pulleys in order to transmit a power. The above described compression rubber layer includes no short fibers. The surface roughness, i.e., the Ra of at least the pulley contact surface of the compression rubber layer is equal to or more than 3 μm.

With the above described configuration, since no short fibers are included in the compression rubber layer, no crack occurs due to the short fibers even when the belt is repeatedly bended while the belt is running. Therefore, the bending fatigue resistance of the belt can be improved. Then, since the surface roughness, i.e., the Ra of the pulley contact surface of the compression rubber layer is equal to or more than 3 μm, the friction coefficient between the pulley contact surface of the compression rubber layer and the pulley surface can be reduced. Thereby, as it is illustrated in the following Table 2, a noise caused in running the belt (a slipping noise) can be reduced.

In the above described configuration, the compression rubber layer is mixed with resin powders (a second invention). As described above, the resin powders are mixed within the compression rubber layer, instead of the short fibers as in the conventional art, so that an occurrence of the cracks is suppressed in comparison with a case that the short fibers are mixed within the compression rubber layer. Therefore, the bending fatigue resistance of the belt can be improved as well as the surface roughness (i.e., the Ra equal to or more than 3 μm) of the pulley contact surface as in the above described first invention can be realized with ease.

On the other hand, a surface layer is provided to the pulley contact surface side of the compression rubber layer and the resin powders are mixed within the surface layer instead of mixing the resin powders throughout the compression rubber layer (a third invention).

Accordingly, since it becomes unnecessary to disperse the resin powders throughout the compression rubber layer, easy production of the compression rubber layer can be achieved as well as, since no resin powder is mixed in the compression rubber layer other than the surface layer thereof, no crack occurs within the compression rubber layer while the cracks occur in the surface layer because of the resin powders. Therefore, the bend fatigue life can be further improved in portions except for the surface layer. Consequently, with the above described configuration, the durability of the belt can be improved in comparison with the case where the resin powders are mixed throughout the compression rubber layer.

Further, the average particle size of the resin powders is preferably equal to or more than 45 μm (a fourth invention). Accordingly, as it is illustrated in Table 2, the surface roughness, i.e., the Ra of the pulley contact surface of the compression rubber layer can be equal to or more than 3 μm. Therefore, the configuration of the first invention can be realized securely and with ease.

Further, it is preferable that the resin powder has a tensile modulus equal to or more than 1000 MPa (a fifth invention). In order to expose the resin powders mixed within the compression rubber layer to the surface of the compression rubber layer, the compression rubber layer is subjected to grinding while the belt is manufactured. Since the tensile modulus of the resin powders is set to the above described range, more resin powders can be exposed on the surface of the compression rubber layer in comparison with a case where the resin powder has a lower tensile modulus. Further, since the resin powders having the above described tensile modulus are used, an abrasion loss when the resin powders contact the surfaces of the pulleys can be reduced in comparison with the case where the resin powder has the lower tensile modulus.

Still further, it is preferable that the resin powders are made of ultrahigh molecular weight polyethylene (a sixth invention). As described above, a use of a material which is available with a relatively low cost and has a lower friction coefficient enables a cost reduction of the friction transmission belt, and ensures that the slipping noise while running of the belt is prevented.

It is preferable that a thickness of the surface layer is equal to or more than 15 μm (a seventh invention). Accordingly, even if the surface layer is more or less worn, the entire surface layer is prevented from being worn out. That is, a rapid increase of the friction coefficient can be prevented. Therefore, a noise reduction effect can be kept relatively longer time.

It is preferable that the belt body is a V-ribbed belt body (an eighth invention). With the V-ribbed belt body, in the V-ribbed belt which is generally used in transmitting a power to an auxiliary engine disposed around an engine of a car, a noise while the belt is running can be reduced as well as the durability of the belt can be improved. Thus, the V-ribbed belt body is especially effective.

Advantages of the Invention

In view of the above described friction transmission belt according to the present invention, the compression rubber layer includes no short fibers and the surface roughness, i.e., the Ra of the pulley contact surface of the compression rubber layer is equal to or more than 3 μm, so that both of the improvement in the bend fatigue life and the noise reduction can be achieved. More specifically, since the compression rubber layer is mixed with the resin powders having the average particle size equal to or more than 45 μm, the above described configuration can be realized securely and with ease. The resin powders having the tensile modulus equal to or more than 1000 MPa can realize the above described configuration with ease when the belt is manufactured as well as the abrasion loss caused by a contact with the pulley surface can be reduced. Further, the resin powders are made of the ultrahigh molecular weight polyethylene, so that the noise reduction effect can be improved while the cost is saved.

On the other hand, the surface layer is provided to a pulley contact surface side of the compression rubber layer and the resin powders are mixed only within the surface layer. Thereby, the durability of the belt can be enhanced. A thickness of the surface layer is set to a value equal to or more than 15 μm, which enables to keep the noise reduction effect for a relatively longer time.

DESCRIPTION OF REFERENCE CHARACTERS

| | |
|---|---|
| B | V-ribbed belt (friction transmission belt) |
| 10 | V-ribbed belt body |
| 11 | adhesive rubber layer |
| 12, 22 | compression rubber layer |
| 13, 23 | rib portion |
| 15 | resin powders |
| 16 | core wire |
| 17 | rear surface canvas layer |
| 24 | surface layer |
| 25 | main body layer |
| 30, 40, 50 | belt running test machine |
| 31, 41, 51 | driving pulley |
| 32, 42, 52 | driven pulley |
| 43 | rib pulley |
| 53, 54 | idler pulley |

DESCRIPTION OF EMBODIMENT

Embodiment of the present invention is described hereinafter based on drawings attached hereto. Note that the preferred embodiment described below is offered for purposes only and are not intended to limit the scope of the invention, applications thereof and uses thereof.

First Embodiment

Figure 1:
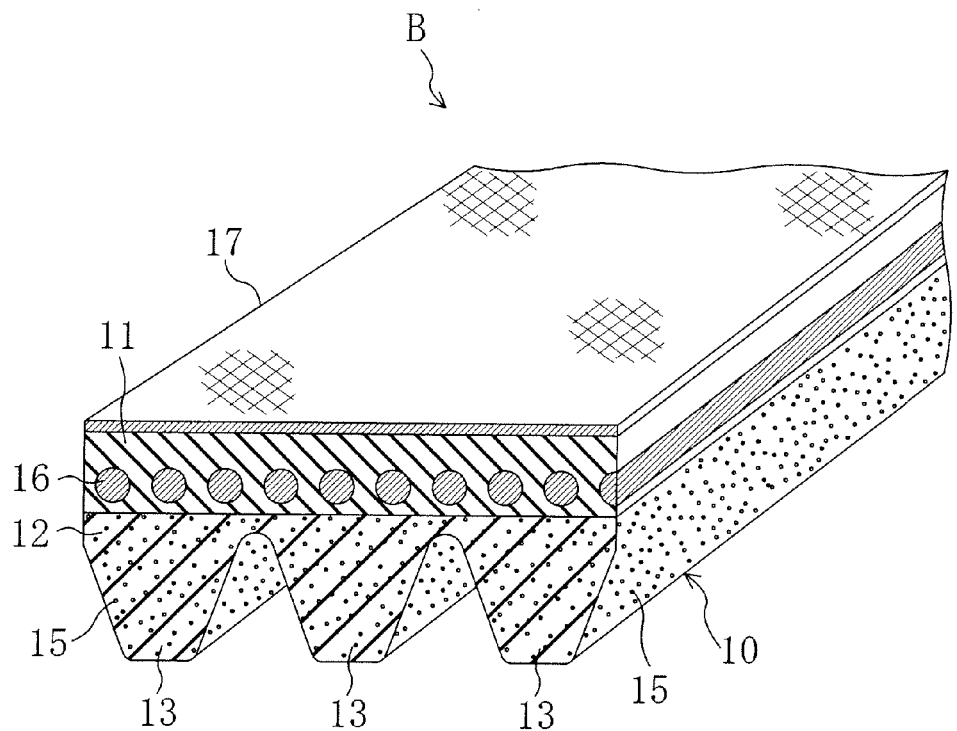
FIG. 1 is a perspective view illustrating a schematic configuration of a V-ribbed belt which is an example of a friction transmission belt according to a first embodiment of the present invention.

As an example of the friction transmission belt according to the first embodiment of the present invention, a V-ribbed belt B is illustrated in FIG. 1. This V-ribbed belt B includes a V-ribbed belt body 10 and a rear surface canvas layer 17 which is laminated on a side of a surface (i.e., a rear surface or an external circumferential surface) of this V-ribbed belt body 10. The V-ribbed belt body 10 includes a generally rectangular adhesive rubber layer 11 in cross section and a compression rubber layer 12 which is laminated on a lower surface side of the adhesive rubber layer 11, i.e., which is laminated on the lower surface (i.e., a bottom surface or an inner circumferential surface) side of the V-ribbed belt body 10.

The rear surface canvas layer 17 is subjected to adhesion processing through rubber cement. The rubber cement is made such that rubber is melt in a solvent and attached to woven fabric made of nylon or cotton. Thus made rear surface canvas layer 17 is attached to a rear surface of the V-ribbed belt body 10 (i.e., the adhesive rubber layer 11). Accordingly, the rear surface canvas layer 17 takes a roll of power transmission when a rear surface of the belt is wrapped over the flat pulleys (e.g., rear surface idlers) such that the rear surface of the belt contacts the flat pulleys.

On the other hand, the adhesive rubber layer 11 is composed of a rubber component such as ethylene-propylene-diene monomer (EPDM) excellent in a heat resistance and a weather resistance. The adhesive rubber layer 11 includes a plurality of core wires 16 formed into spiral shapes. The plurality of core wires 16 extend in a belt length direction and are arranged such that the core wires 16 are spaced at predetermined pitches in a belt width direction so as to be embedded in the adhesive rubber layer 11. Each of these core wires 16 is formed such that a plurality of single yarns made of polyether (PET) fibers or the like is twisted.

The compression rubber layer 12, made of a rubber component including EPDM as a main rubber, is mixed with resin powders 15 having a tensile modulus equal to or more than 1000 MPa and the average particle size equal to or more than 45 μm, in addition to carbon black or the like, in such a manner that the resin powders 15 are dispersed in the compression rubber layer 12. In the present embodiment, the average particle size of the resin powders 15 is equal to or more than 45 μm. However, it is more preferable that the average particle size of the resin powders 15 is equal to or less than 165 μm in order to prevent the belt running life from being degraded due to the occurrence of the cracks. In the V-ribbed belt B according to the present embodiment, the short fibers which are included in the conventional V-ribbed belt are not mixed.

The resin powders 15 are mixed with raw rubber (EPDM) such that the resin powders 15, for example, of 30 parts by weight is mixed with the raw rubber of 100 parts by weight. As a mixing ratio of the resin powders 15, it is preferable that the resin powders 15 of a range between 20 and 60 parts by weight is mixed with the raw rubber (EPDM) of 100 parts by weight. Mixture of the resin powders 15 of this range enables to obtain the surface roughness, i.e., the Ra equal to or more than 3 μm on the belt surface. Also, it is effective in that the belt running life is prevented from being degraded due to the occurrence of the cracks. The resin powders 15 are composed, for example, of nylon, aramid or ultrahigh molecular weight polyethylene (UHMWPE).

Here, the tensile modulus of the resin powders 15 can be obtained by measuring a tensile modulus with respect to a test piece formed of resin identical to the resin composing the resin powders 15 according to an ASTM testing method D638.

In the lower surface side of the compression rubber layer 12, a plurality of lines of rib portions 13, 13, . . . (three lines in the present embodiment), respectively, extending in the belt length direction are formed such that the plurality of lines of rib portions are arranged side by side at predetermined pitches in a belt width direction. Therefore, when the V-ribbed belt B is wrapped over the pulleys, a side surface of each of the rib portions 13 of the compression rubber layer 12 contacts a side surface of each of grooves of the corresponding pulley.

Then, the mixture of the above described resin powders 15 into the compression rubber layer 12 makes the surface roughness, i.e., the Ra (Arithmetical Mean Deviation of the Surface) of a contact surface contacting with each pulley which is the surface of the rib portion 13, equal to or more than 3 μm. In other words, portions of the resin powders 15 mixed within the compression rubber layer 12 protrude from the surface of the compression rubber layer 12. Thereby, the surface roughness has the predetermined roughness as described above. From a point of view to prevent the belt running life from being degraded due to the crack occurrence, it is preferable that the surface roughness, i.e., Ra of the side surface of the rib portion 13 is equal to or less than 70 μm.

Then, an example of a manufacturing method of the V-ribbed belt B having the above describe configuration is briefly described below.

In manufacturing the V-ribbed belt B, an inner mold having a molding surface on an outer circumferential surface thereof which forms a belt rear surface into a predetermined shape, and a rubber sleeve having a molding surface on an inner circumferential surface thereof which forms a belt inner surface into a predetermined shape are used.

After an outer circumference of the inner mold is covered with a rear surface canvas made of woven fabric, which has been subjected to adhesion processing in which adhesive is attached to the rear surface canvas, an uncrosslinked rubber sheet is wrapped over the rear surface canvas in order to form a rear surface side portion of the adhesive rubber layer 11.

Then, after core wires 16, having been provided with adhesive to be attached to the core wires 16, are wrapped over into a spiral shape, the uncrosslinked rubber sheet is wrapped over the core wires 16 in order to form an inner surface side portion of the adhesive rubber layer 11. Further, raw rubber mixed with the resin powders 15, in addition to a filler such as the carbon black and rubber compounding chemicals such as a plasticized agent, is laminated thereon as the uncrosslinked rubber sheet which forms the compression rubber layer 12. When wrapping each of the uncrosslinked rubber sheets, both end portions of each of the uncrosslinked rubber sheets in a wrapping direction are not overlapped to each other but are brought into abutment to each other.

Then, the rubber sleeve is engaged over the molded body on the inner mold. It is set into a forming pot to heat the inner mold at high temperature steam as well as to press the rubber sleeve in an inner radial direction by applying a high pressure. At the time, rubber component flows to advance a crosslinking reaction and also an adhesive reaction of the core wires 16 and the rear surface canvas advances with respect to the rubber. Accordingly, a cylindrical shaped belt slab is formed.

Then, the cylindrical belt slab is removed from the inner mold and divided into several numbers of cylindrical belt slabs in a longitudinal direction of the cylindrical shape. Thereafter, an outer circumference of each of the divided cylindrical belt slabs is ground to form the rib portion 13. At the time, each side surface of the rib portion 13 is ground such that the surface roughness, i.e., the Ra of each side surface of the rib portion 13 becomes equal to or more than 3 μm. Here, upon grinding, it is preferable that the rib portion 13 is ground so as not to cause the resin powders 15 to dropout from the rib portion as much as possible, i.e., so as to keep the resin powders 15 in/on the rib portion 13 as much as possible. Accordingly, a surface having the surface roughness, i.e., Ra equal to or more than 3 μm can be securely formed on the side surface of the rib portion 13.

Here, in order to control the surface roughness of the side surface of the rib portion 13, grinding conditions such as an abrasive grain gauge of a grinding wheel which is used in grinding the rib portion 13 or a surface pressure upon grinding are selected, as required, or the average particle size of the resin powders 15 is selected, as required.

Finally, the belt slab, which was thus divided and rib portions were formed on the outer circumferential surface thereof, is cut in a width direction by a predetermined width and thereafter each of the divided belt slabs is reversed. Thereby, the V-ribbed belt B can be obtained.

The manufacturing method of the V-ribbed belt B is not limited to the above described method, but may be manufactured in a manner that layers are laminated from the compression rubber layer 12 onto the inner mold where shapes of the rib portions are formed and then the laminated layers are pressed while the laminated layers are heated between the inner mold and the outer mold. Also, in this case, the side surfaces of the rib portions 13 of the V-ribbed belt B are ground to cause the resin powders 15 to be exposed, thereby setting the surface roughness, i.e., Ra to a value equal to or more than 3 μm.

With the above described configuration, since the resin powders 15 are mixed within the compression rubber layer 12 instead of the conventional short fibers, cracks as in a case of the short fibers can be prevented from occurring in bending the belt while the belt is running. Therefore, the durability of the belt B can be improved. Further, the resin powders 15 protrude from the surfaces of the rib portions 13 of the compression rubber layer 12 to make the surface roughness of the rib portions 13 to be a predetermined roughness (i.e., Ra equal to or more than 3 μm), so that the friction coefficient with the pulley surfaces can be reduced. Accordingly, the slipping noise while the belt is running can be reduced.

Further, in a case where the average particle size of the resin powders 15 is equal to or more than 45 μm, the surface roughness of the rib portions 13 of the compression rubber layer 12 as described above can be realized securely and with ease. Still further, in a case where the resin powder 15 has the tensile modulus equal to or more than 1000 MPa, more specifically, in a case where the resin powders 15 are made of UHMWPE, the resin powders 15 hardly dropout from the rib portions 13 when the rib portions 13 are ground even without under a specific grinding condition. Therefore, only rubber portions around the surface are removed by the grinding even in a step of manufacturing the belt, i.e., more resin powders 15 can be remained. Also, abrasion caused by the contact with the pulleys while the belt is running can be reduced, thereby enabling to improve the durability.

The resin powders 15 are composed of the ultrahigh molecular weight polyethylene which is available with a cost lower than the aramid and has the friction coefficient lower than the nylon. Therefore, the V-ribbed belt B of the lower cost and having a high noise reduction effect can be obtained.

The above embodiment is directed to, but not limited to, the V-ribbed belt. The belt may be the V-ribbed belt or the flat belt as far as the belt includes a rubber layer which contacts the pulleys. The rubber layer of the belt may be anything as far as the resin powders 15 are mixed therein.

Second Embodiment

Figure 2:
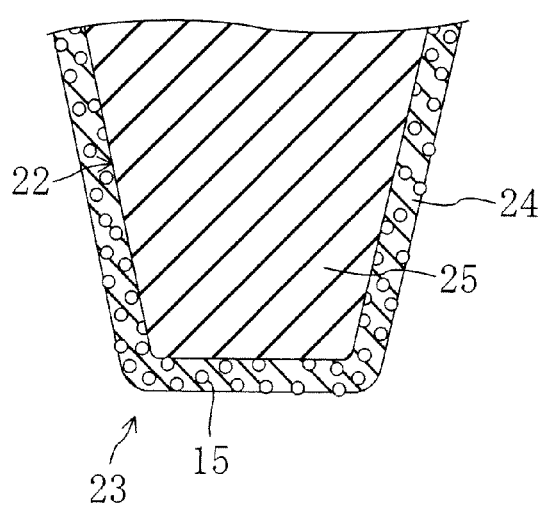
FIG. 2 is a partially enlarged cross sectional view of a rib portion of the V-ribbed belt according to a second embodiment.

A configuration of a V-ribbed belt according to a second embodiment of the present invention is described with reference to FIG. 2. As it is illustrated in FIG. 2, in the V-ribbed belt according to the second embodiment, a rib portion 23 of a compression rubber layer 22 includes a surface layer 24 and a main body layer 25. Only the surface layer 24 is mixed with the resin powders 15. Since the configurations other than the above are similar to those of the first embodiment, FIG. 2 illustrates only an enlarged cross section of the rib portion 23. Further, the portions identical to those of the first embodiment are given the same reference characters in the following description.

More specifically, the rib portion 23 of the compression rubber layer 22 includes a surface layer 24 of the surface side and the main body layer 25. The surface layer 24 is composed such that the resin powders 15 are mixed within a rubber composition including the EPDM as the main rubber and is provided such that the surface layer 24 covers the main body layer 25 which does not include the resin powders 15. As described above, a mixture of the resin powders 15 only within the surface side of the compression rubber layer 22 enables a secure prevention of the occurrence of the cracks caused due to the resin powders within the compression rubber layer 22. Therefore, in comparison with a case that the resin powders 15 are mixed throughout the compression rubber layer 22, the durability of the inside of the compression rubber layer 22 can be improved. That is, the durability throughout the compression rubber layer 22 can be improved.

Similar to the first embodiment, a surface of the surface layer 24 is also formed such that the surface roughness, i.e., Ra becomes equal to or more than 3 μm. Accordingly, the friction coefficient with the surfaces of the pulleys can be reduced and the occurrence of the slipping noise while the belt is running can be suppressed. In this embodiment, in order to prevent the belt running life from being degraded due to the occurrence of the cracks, it is preferred that the surface roughness, i.e., Ra of the side surfaces of the rib portions 13 is equal to or less than 70 μm. Further, the mixture of the resin powders 15, but not the short fibers, as similar to the first embodiment, within the surface layer 24 enables to suppress the occurrence of the cracks caused by repetition of the bending of the belt B while the belt is running. Thereby, the bend fatigue life of the belt B can be improved.

The surface layer 24 is formed such that a thickness of the surface layer 24 preferably becomes equal to or more than 15 μm. Accordingly, even if the surface layer 24 is worn out more or less, the surface layer 24 including the resin powders 15 can be prevented from being worn down. Abrasion between the surface layer 24 and the pulley surfaces can be reduced. In other words, efficiency in reducing the slipping noise while the belt is running can be kept for a relatively longer time period. A preferable thickness of the surface layer 24 is a range between 15 μm and 320 μm, more preferably, a range between 20 and 150 μm. If the surface layer 24 is thinner, the efficient in reducing the slipping noise and the durability against the abrasion tend to be degraded. On the other hand, if the surface layer 24 is thicker, the belt running life tends to be less because of the occurrence of the cracks. Therefore, the above described range of thickness is preferred.

The manufacturing method of the V-ribbed belt having the above described configuration may be a manufacturing method of the V-ribbed belt B of the first embodiment wherein uncrosslinked rubber sheets, respectively, corresponding to the surface layer 24 and the main body layer 25, are overlapped to each other to be heat-pressed by using a rib-shaped mold. Alternatively, the manufacturing method may be the one, after applying adhesive applicable to the surface layer 24 to the uncrosslinked rubber sheet corresponding to the main body layer 25 of the compression rubber layer, wherein the resin powders are attached to the main body layer 25 by blowing the resin powders thereon to be subjected to a heat-pressing.

EXAMPLES

Tests performed with respect to the V-ribbed belt and evaluation results thereof are described below.

(Belt for Test Evaluation)

The V-ribbed belts of the following examples 1 through 12 and comparative examples 1 through 3 were manufactured. Compositions of these belts are shown in Table 1. Every manufactured V-ribbed belt has a circumferential length of 1000 mm, three ribs having a 2.0 mm height, a V-angle in cross section of 40 degrees and a pitch of 3.56 mm.

Example 1

The EPDM, i.e., raw rubber, is used as the rubber component. In an Example 1, a V-ribbed belt having a configuration identical to that of the first embodiment is used. More specifically, such a V-ribbed belt is used that the compression rubber layer is formed of a rubber component composed of 20 parts by weight of carbon black (HAF), 40 parts by weight of carbon black (GPF), 14 parts by weight of softener, 5 parts by weight of zinc oxide, 1 part by weight of stearic acid, 2.5 parts by weight of antiaging agent, 2 parts by weight of sulfur as a cross-linking agent and 4 parts by weight of vulcanization accelerator with respect to 100 parts by weight of this EPDM.

Example 2

In Example 2, a V-ribbed belt having a configuration identical to that of the example 1, except that the compression rubber layer is formed of a rubber component in which 60 parts by weight of the carbon black (HAF), instead of 40 parts by weight of the carbon black (GPF), and 30 parts by weight of nylon powders as the resin powders are mixed, is used.

Example 3

In Example 3, a V-ribbed belt having a configuration identical to that of the Example 2, except that the compression rubber layer is formed of the rubber components in which 30 parts by weight of aramid powders is mixed as the resin powders instead of mixing the nylon powders, is used.

Example 4

In Example 4, a V-ribbed belt having a configuration identical to that of the Example 2, except that the compression rubber layer is formed of a rubber composition in which 30 parts by weight of UHMWPE powders C is mixed as the resin powders instead of mixing the nylon powders, is used.

Example 5

In Example 5, a V-ribbed belt having a configuration identical to that of the Example 2, except that the compression rubber layer is formed of rubber components in which 30 parts by weight of UHMWPE powders A are mixed as the resin powders instead of mixing the nylon powders, is used.

Example 6

In an Example 6, a V-ribbed belt having a configuration identical to that of the second embodiment, in which the surface layer of a 15 µm thickness is formed over the compression rubber layer (having the composition identical to that of the Example 5), is used. At the time, a composition of the main body layer of the compression rubber layer is the same as a composition of the surface layer except that the main body layer of the compression rubber layer is not mixed with the resin powders. Such a belt manufacturing method is employed that the uncrosslinked rubber sheets are overlapped to the surface layer and the main body layer, respectively, to heat-press it by using a rib-shaped mold and further the side surfaces of the ribs are ground in order to provide a predetermined surface roughness to the side surfaces.

Example 7

In an Example 7, a V-ribbed belt having a configuration identical to that of the Example 6, except that a thickness of the surface layer is 20 µm, is used.

Example 8

In an Example 8, a V-ribbed belt having a configuration identical to that of the Example 6, except that a thickness of the surface layer is 100 µm, is used.

Example 9

In an Example 9, a V-ribbed belt having a configuration identical to that of the Example 6, except that a thickness of the surface layer is 200 µm, is used.

Example 10

In an Example 10, a V-ribbed belt having a configuration identical to that of the Example 6, except that a thickness of the surface layer is 300 µm, is used.

Example 11

In an Example 11, a V-ribbed belt having a configuration identical to that of the Example 6, except that a thickness of the surface layer is 320 µm, is used.

Example 12

In an Example 12, a V-ribbed belt having a configuration identical to that of the Example 8, except that a surface roughness, i.e., Ra of the surface layer is different from that of the Example 8, is used. In this Example 12, the side surfaces of the ribs are ground by using grinding wheels of the abrasive grain gauge of #40. The side surfaces of the ribs of the V-ribbed belts of the Examples 1 through 11, except for the Example 12, and Comparative Examples 1 through 3 are ground by using the grinding wheels of the abrasive grain gauge of #120.

Comparative Example 1

In a Comparative Example 1, a V-ribbed belt having a configuration identical to that of the Example 2, except that the compression rubber layer is formed of a rubber composition mixed with nylon short fibers of 25 parts by weight instead of nylon powders, is used.

Comparative Example 2

In a Comparative Example 2, a V-ribbed belt having a configuration identical to that of the Comparative Example 1, except that the compression rubber layer is formed of the rubber composition without including the nylon short fibers, is used.

Comparative Example 3

In a Comparative Example 3, a V-ribbed belt having a configuration identical to that of the Example 1, except that the compression rubber layer is formed of the rubber composition mixed with 30 parts by weight of the UHMWPE powders B as the resin powders, is used.

TABLE 1

| NAME OF COMPOUNDING INGREDIENT | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 | EXAMPLE 5 |
|---|---|---|---|---|---|---|---|---|
| EPDM | 100 | 100 | 100 | 100 | 100 | 100 | 100 | 100 |
| HAF | 60 | 60 | 60 | 20 | 60 | 60 | 60 | 60 |
| GPF | | | | 40 | | | | |
| SOFTENER | 14 | 14 | 14 | 14 | 14 | 14 | 14 | 14 |
| ZINC OXIDE | 5 | 5 | 5 | 5 | 5 | 5 | 5 | 5 |
| STEARIC ACID | 1 | 1 | 1 | 1 | 1 | 1 | 1 | 1 |
| ANTIAGING AGENT | 2.5 | 2.5 | 2.5 | 2.5 | 2.5 | 2.5 | 2.5 | 2.5 |
| SULFUR | 2 | 2 | 2 | 2 | 2 | 2 | 2 | 2 |
| VULCANIZATION ACCELERATOR | 4 | 4 | 4 | 4 | 4 | 4 | 4 | 4 |
| NYLON SHORT FIBER | 25 | | | | | | | |
| NYLON POWDER | | | | | | 30 | | |
| UHMWPE POWDER A | | | | | | | | 30 |
| UHMWPE POWDER B | | | 30 | | | | | |
| UHMWPE POWDER C | | | | | | | 30 | |
| ARAMID POWDER | | | | | | | 30 | |

| NAME OF COMPOUNDING INGREDIENT | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|
| EPDM | 100 | 100 | 100 | 100 | 100 | 100 | 100 |
| HAF | 60 | 60 | 60 | 60 | 60 | 60 | 60 |
| GPF | | | | | | | |
| SOFTENER | 14 | 14 | 14 | 14 | 14 | 14 | 14 |
| ZINC OXIDE | 5 | 5 | 5 | 5 | 5 | 5 | 5 |
| STEARIC ACID | 1 | 1 | 1 | 1 | 1 | 1 | 1 |
| ANTIAGING AGENT | 2.5 | 2.5 | 2.5 | 2.5 | 2.5 | 2.5 | 2.5 |
| SULFUR | 2 | 2 | 2 | 2 | 2 | 2 | 2 |
| VULCANIZATION ACCELERATOR | 4 | 4 | 4 | 4 | 4 | 4 | 4 |
| NYLON SHORT FIBER | | | | | | | |
| NYLON POWDER | | | | | | | |
| UHMWPE POWDER A | 30 | 30 | 30 | 30 | 30 | 30 | 30 |
| UHMWPE POWDER B | | | | | | | |
| UHMWPE POWDER C | | | | | | | |
| ARAMID POWDER | | | | | | | |

Here, Nordel IP 4640 produced by Dow Chemical Ltd., is used as the EPDM, SEAST 3 produced by Tokai Carbon Co. Ltd., is used as the carbon black (HAF), and SEAST V produced by Tokai Carbon Co. Ltd., is used as the carbon black (GPF), respectively. SUNFLEX 2280 produced by Japan Sun Oil Company Ltd., is used as the softener, Zinc Oxide No. 1 produced by SAKAI CHEMICAL INDUSTRY CO., LTD., is used as the zinc oxide, Beads Stearic Camellia produced by NOF CORPORATION is used as the stearic acid, NOCRAC 224 produced by OUCHI SHINKO CHEMICAL INDUSTRIAL CO., LTD., is used as the antiaging agent, Oil Sulfur produced by Tsurumi Chemical Co. is used as the sulfur, and EP-150 produced by OUCHI SHINKO CHEMICAL INDUSTRIAL CO., LTD., is used as the vulcanization accelerator, respectively. Further. Leona 66 (1 mm-cut product) produced by Asahi Kasei Corporation is used as the nylon short fibers, A1020LP produced by UNITIKA LTD., is used as the nylon powders. HI-ZEX MILLION 240S produced by Mitsui Chemicals Inc. is used as the UHMWPE powders A, MIPELON XM220 produced by Mitsui Chemicals Inc. is used as the UHMWPE powders B, INHANCE UH-1500 produced by Fluoro-Seal, Ltd., is used as the UHMWPE powders C, and TW5011 produced by TEIJIN TECHNO PRODUCTS LTD., is used as the aramid powders, respectively.

(Test Evaluation Method)

<Abrasion Resistance Test>

Figure 3:
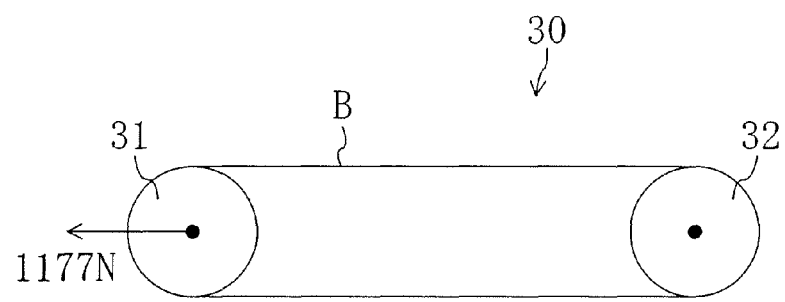
FIG. 3 illustrates a layout of pulleys of a belt running test machine for an abrasion resistance test.

FIG. 3 illustrates a layout of a belt running test machine 30 for the purpose of an abrasion resistance test evaluation of the V-ribbed belt. This belt running test machine 30 includes rib pulleys, such as a driving pulley 31 and a driven pulley 32, respectively, having a diameter of 60 mm.

With respect to each of the V-ribbed belts of the Examples 1 through 12 and the Comparative Examples 1 through 3, the V-ribbed belt is wrapped over the pulleys 31 and 32 after measuring a weight of the belt in a manner that the rib portions 13 and 23, respectively, contacts the pulleys 31 and 32. At the time, the driving pulley 31 is pulled in a side direction such that a dead weight of 1177 N is applied to the driving pulley 31 as well as a rotation load of 7 W is applied to the driven pulley 32. Then, a belt running test was carried out such that the driving pulley 31 is rotated for 24 hours at a rotation speed of 3500 rpm under a room temperature (i.e., 23° C.).

A weight of the belt after running was measured and an abrasion loss (%) was calculated based on the following formula.

Abrasion loss(%)=((initial weight−weight after running)/initial weight)×100

<Flexing Life Evaluation Test>

Figure 4:
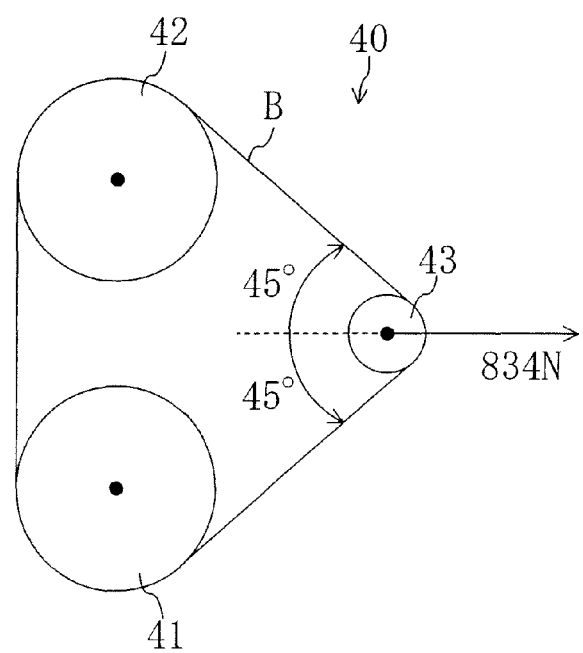
FIG. 4 illustrates a layout of the pulleys of the belt running test machine for a flexing life evaluation test.

FIG. 4 illustrates a layout of a belt running test machine 40 for the purpose of a flexing life evaluation of the V-ribbed belt.

This belt running test machine 40 includes rib pulleys, such as a driving pulley 41 and a driven pulley 42, each having a diameter of 120 mm and being located one above the other, and a rib pulley 43 which is located a side a middle position in the up-and-down direction of the driving pulley 41 and the driven pulley 42 and has a diameter of 45 mm. More specifically, the driven pulley 42 is located above the driving pulley 41 and the rib pulley 43 is located in a manner that the rib pulley 43 is located rightwardly at the middle position in the up-and-down direction when viewing from a front with respect to the pulleys 41 and 42 (right side of a sheet of FIG. 4) and that an angle of the belt wrapping over the pulleys takes 90 degrees.

A belt running test is carried out in a manner that each of the V-ribbed belts of the Examples 1 through 12 and the Comparative Examples 1 through 3 is wrapped over the three pulleys 41 through 43, the rib pulley 43 is pulled in a side direction such that a set weight of 834 N is applied to the rib pulley 43 and the driving pulley 41 is rotated at a rotation speed of 4900 rpm under an ambient temperature of 23° C.

Then, a belt running time before the cracks occur to the rib portions 13 of the V-ribbed belt B was measured. This time corresponds to the flexing life of the belt.

<Noise Measurement Test>

Figure 5:
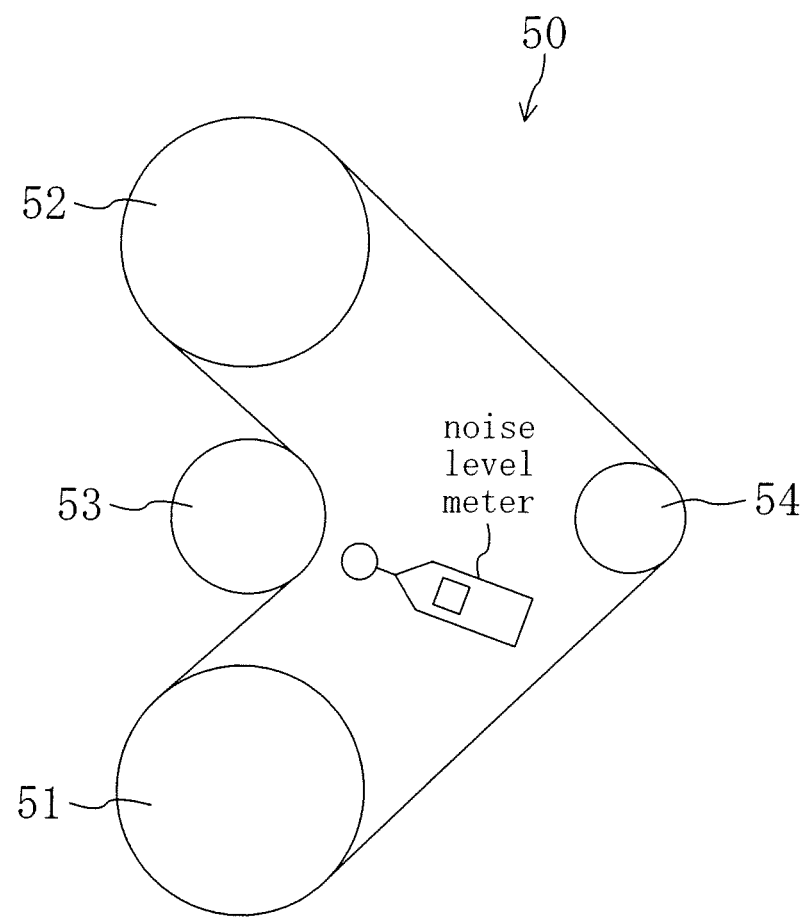
FIG. 5 illustrates a layout of the pulleys of the belt running test machine for a noise measurement test.

FIG. 5 illustrates a layout of a belt running test machine 50 for the purpose of a noise measurement of the V-ribbed belt. This belt running test machine 50 includes rib pulleys, such as a driving pulley 51 and a driven pulley 52, each having a diameter of 120 mm and being located in an up-and-down direction, an idler pulley 53, which is located at a middle position in the up-and-down direction of the driving pulley 51 and the driven pulley 52 and which has a diameter of 70 mm, and an idler pulley 54 which is positioned aside the middle position in the up-and-down direction of the driving pulley 51 and the driven pulley 52 and has a diameter of 55 mm. More specifically, the driven pulley 52 is located above the driving pulley 51, the idler pulley 53 is located at a middle position in the up-and-down direction when viewing from the front with respect to the pulleys 51 and 52, and the idler pulley 54 is located at a right side when viewing from the front (right side of the sheet of FIG. 5). Then, the idler pulleys 53 and 54 are located such that a belt wrapping angle becomes 90 degrees, respectively.

Each of the V-ribbed belts of the Examples 1 through 12 and the Comparative Examples 1 through 3 is wrapped over the four pulleys 51 through 54. The idler pulleys 53 and 54 are set in a manner that a load of 2.5 kW per a rib is applied to the driven pulley 52 and a set weight of 277 N per a rib is applied to the idler pulley 54. Then, the belt running test was carried out such that the driving pulley 51 was rotated at a rotation speed of 4900 rpm.

A microphone of a noise level meter (e.g., a model number "NA-40" manufactured by RION) was disposed at a position about 10 cm aside from a position where the belt contacts the idler pulley 53. Then, a noise occurred in carrying out the belt running test was measured.

Here, a slipping noise when water (200 cc/min.) was poured over to the driving pulley 51 was detected as a noise while the belt was running after the driving pulley 51 was caused to run for a predetermined distance.

(Evaluation Result of the Test)

Result of the Test is illustrated in Table 2.

TABLE 2

|  | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 | EXAMPLE 5 |
|---|---|---|---|---|---|---|---|---|
| SHORT FIBER | ○ | — | — | — | — | — | — | — |
| RESIN POWDER | — | — | UHMWPE | — | NYLON | ARAMID | UHMWPE | UHMWPE |
| TENSILE MODULUS OF RESIN (MPa) | — | — | 1090 | — | 2600 | 100000 | 1090 | 1090 |
| THICKNESS OF SURFACE LAYER (μm) | — | — | — | — | — | — | — | — |
| AVERAGE PARTICLE SIZE OF POWDER (μm) | — | — | 25 | — | 75 | 95 | 45 | 120 |
| Ra (μm) | 3.27 | 1.11 | 1.84 | 3.1 | 3.22 | 4.47 | 3.04 | 3.12 |
| ABRASION LOSS (%) | 1.3 | 2.6 | 1.1 | 3.1 | 1.2 | 1.2 | 1.1 | 1.1 |
| RUNNING TIME BEFORE CRACKS OCCUR (h) | 696 | 1200 | 1104 | 912 | 960 | 960 | 984 | 936 |
| BELT SLIPPING NOISE AFTER RUNNING A PREDETERMINED TIME | SILENT | LARGE | MIDDLE | SMALL | SILENT | SILENT | SILENT | SILENT |

|  | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|
| SHORT FIBER | — | — | — | — | — | — | — |
| RESIN POWDER | UHMWPE | UHMWPE | UHMWPE | UHMWPE | UHMWPE | UHMWPE | UHMWPE |
| TENSILE MODULUS OF RESIN (MPa) | 1090 | 1090 | 1090 | 1090 | 1090 | 1090 | 1090 |
| THICKNESS OF SURFACE LAYER (μm) | 15 | 20 | 100 | 200 | 300 | 320 | 100 |

TABLE 2-continued

| | | | | | | | |
|---|---|---|---|---|---|---|---|
| AVERAGE PARTICLE SIZE OF POWDER (μm) | 120 | 120 | 120 | 120 | 120 | 120 | 120 |
| Ra (μm) | 3.05 | 3.1 | 3.1 | 3.19 | 3.22 | 3.27 | 69 |
| ABRASION LOSS (%) | 2.5 | 1.1 | 1 | 1.2 | 1.2 | 1.1 | 1.2 |
| RUNNING TIME BEFORE CRACKS OCCUR (h) | 1008 | 1008 | 1032 | 984 | 984 | 912 | 912 |
| BELT SLIPPING NOISE AFTER RUNNING A PREDETERMINED TIME | SMALL | SILENT | SILENT | SILENT | SILENT | SILENT | SILENT |

As a result of the above test, it is seen that the compression rubber layer 22 mixed with the resin powders 15 (i.e., Examples 2 through 12 and Comparative Example 3) has a longer belt running time before the cracks occur and thus the flexing life of the belt becomes longer in comparison with the compression rubber layer 22 mixed with the short fibers (i.e., Comparative Example 1). Comparing with the compression rubber layer 22 mixed with the short fibers, it is seen that the abrasion loss is smaller in the compression rubber layer 22 mixed with the resin powders 15 and therefore, the durability thereof improves.

The surface roughness, i.e., the Ra of the surface of the rib portion 23 of the compression rubber layer 22 (i.e., a contact surface with the pulley surface) equal to or less than 3 μm (Comparative Examples 2 and 3) causes a larger belt slipping noise in comparison with the surface roughness, i.e., the Ra equal to or more than 3 μm (Examples 1 through 12 and Comparative Example 1). In Table 2, the Ra was measured by using S-3000 manufactured by Mitsutoyo Corporation.

Even if the surface roughness, i.e., the Ra of the rib portion 23 is equal to or more than 3 μm, it is also seen that the compression rubber layer 22 which does not include the short fibers or the resin powders (Example 1) has the abrasion loss larger than that of the compression rubber layer 22 including the short fibers or the resin powders (Examples 2 through 12 and the Comparative Example 1). In the Example 1, in order to realize the Ra equal to or more than 3 μm, the carbon black (GPF) having a large particle size is used. However, a less additional strength function is obtained with the carbon black having a larger particle size and thus the abrasion resistance and the crack resistance life is degraded. In a case where the carbon black (HAF) having a smaller particle size is used (Comparative Example 2), these performances can be improved. However, as described above, since the surface roughness, i.e., the Ra becomes less than 3 μm, the slipping noise increases.

It is seen from Table 2 that, in order to set the surface roughness, i.e., the Ra to a value equal to or more than 3 μm, it is effective to set the average particle size of the resin powders to a value equal to or more than 45 μm. Here, the average particle size is obtained in a manner that the powders are observed with a magnification of 450 times by using a digital microscope VHX-200 manufactured by Keyence Corporation and 30 particles among the powders are selected to obtain the average particle size.

In view of the above, in order to elongate the flexing life of the belt while reducing the slipping noise of the belt (i.e., the noise caused while the belt is running), it is necessary to set the surface roughness, i.e., the Ra of the surfaces of the rib portions 23 of the compression rubber layer 22 to a value equal to or more than 3 μm without using the short fibers. To obtain the surface roughness, i.e., the Ra equal to or more than 3 μm, it is preferable that powdery particle members 15 having an average particle size equal to or more than 45 μm are mixed within the compression rubber layer 22. With such a configuration, the surface roughness, i.e., the Ra equal to or more than 3 μm can be realized securely and with ease as well as the abrasion loss can be lessen owing to the particle members 15. Thereby, the durability can be improved.

Further, in a case where the resin powders 15 are not mixed throughout the compression rubber layer 12 but are mixed only with a surface layer 24 which is provided on the surface side of the compression rubber layer 22 (Examples 6 through 12), since resin powders 15 are mixed within the surface layer 24 but not mixed within the rib portions 23, it is seen from Table 2 that the cracks hardly occur within the rib portions 23. Therefore, by mixing the resin powders 15 only within the surface layer 24 of the compression rubber layer 22, a crack resistant life can be elongated in comparison with a case where the resin powders 15 are mixed throughout the compression rubber layer 12 (rib portions). Accordingly, the flexing life of the belt can be improved.

Further, as described above, in a case where the resin powders 15 are mixed only within the surface layer 24, it is seen that the surface layer 24 having a thickness equal to or more than 20 μm (Examples 7 through 12) achieves less slipping noise while the belt is running and smaller abrasion loss in comparison with the surface layer 24 having the thickness of less than 20 μm (Example 6). Therefore, it is preferable to set the thickness of the surface layer 24 to a value equal to or more than 20 μm. Here, the thickness of the surface layer 24 was measured through an observation image at the magnification of 450 times by using the above described microscope.

Still further, in a case where the resin powders used in the present Example, i.e., the resin powders having the tensile modulus equal to or more than 1000 MPa, are used, most of the resin powders 15 can be kept as they are on the surfaces of the rib portions 23 upon grinding while the belt is manufactured. The surface roughness, i.e., the Ra equal to or more than 3 μm can be secured as well as the durability can be improved in comparison with the conventional compression rubber layer 22 including the short fibers. Here, the tensile modulus illustrated in Table 2 was obtained in accordance with the ASTM testing method D638 with respect to the test pieces made of resin identical to the resin for the resin powders.

INDUSTRIAL APPLICABILITY

As described above, the friction transmission belt in the present invention can reduce the noise while improving the durability. Therefore, the friction transmission belt is effective to be used as a belt which is wrapped over between the pulleys in order to transmit the power, for example, in an automobile.

What is claimed is:

1. A friction transmission belt comprising a belt body which includes a compression rubber layer on an inner circumferential side of the belt that is adapted to wrap around pulleys such that the compression rubber layer includes a contact surface that contacts and transmits power to the pulleys:

wherein the compression rubber layer consists of rubber and particles of resin, wherein the particles of resin are exposed on the contact surface on the inner circumferential side of the belt to impart a surface roughness, Ra equal to or more than 3 μm and less than 70 μm, and wherein a surface layer and a main body layer located inside the surface layer are formed on a side of a pulley contact surface of the compression rubber layer; and wherein the resin particles are mixed only within the surface layer.

2. The friction transmission belt according to claim 1, wherein the resin powder has particles have an average particle size equal to or more than 45 μm.

3. The friction transmission belt according to claim 1, wherein the resin powder has a tensile modulus equal to or more than 1000 MPa.

4. The friction transmission belt according to claim 1, wherein the resin powders are made of ultrahigh molecular weight polyethylene.

5. The friction transmission belt according to claim 1, wherein a thickness of the surface layer is equal to or more than 15 μm and equal to or less than 320 μm.

6. The friction transmission belt according to claim 1, wherein the belt body is a V-ribbed belt body.

7. A friction transmission belt comprising a belt body which includes a compression rubber layer on an inner circumferential side of the belt that is adapted to wrap around pulleys such that the compression rubber layer includes a contact surface layer that has a thickness equal to or more than 15 μm that contacts and transmits power to the pulleys, wherein the contact surface layer on the inner circumferential side of the belt consists of a mixture of rubber and particles of resin and has a surface roughness, Ra of at least a pulley contact surface of the compression rubber layer equal to or more than 3 μm and less than 70 μm, and wherein a surface layer and a main body layer located inside the surface layer are formed on a side of a pulley contact surface of the compression rubber layer; and wherein the resin particles are mixed only within the surface layer.

* * * * *